US 11,385,250 B2

United States Patent
Upmeier et al.

(10) Patent No.: US 11,385,250 B2
(45) Date of Patent: Jul. 12, 2022

(54) SYSTEMS AND METHODS FOR CLASSIFYING A BIOLOGICAL SAMPLE REGARDING THE PRESENCE OF AN ANALYTE

(71) Applicant: Roche Diagnostics Operations, Inc., Indianapolis, IN (US)

(72) Inventors: Barbara Upmeier, Iffeldorf (DE); Andreas Woeste, Munich (DE); Vanessa Balassa, Bichl (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 280 days.

(21) Appl. No.: 16/551,783

(22) Filed: Aug. 27, 2019

(65) Prior Publication Data
US 2019/0391172 A1 Dec. 26, 2019

Related U.S. Application Data

(63) Continuation of application No. PCT/EP2018/054495, filed on Feb. 23, 2018.

(30) Foreign Application Priority Data

Mar. 1, 2017 (EP) .................. 17158679

(51) Int. Cl.
*G01N 35/10* (2006.01)
*G01N 21/62* (2006.01)
*G01N 35/00* (2006.01)

(52) U.S. Cl.
CPC ........... *G01N 35/10* (2013.01); *G01N 21/62* (2013.01); *G01N 35/0092* (2013.01); *G01N 35/00594* (2013.01); *G01N 2035/1032* (2013.01)

(58) Field of Classification Search
CPC .... G01N 35/10; G01N 21/62; G01N 35/0092; G01N 35/00594; G01N 2035/1032; G01N 35/00603
See application file for complete search history.

(56) References Cited

U.S. PATENT DOCUMENTS 5,308,775 A * 5/1994 Donovan ......... G01N 33/54366
422/417
6,306,616 B1 10/2001 Shindelman
(Continued)

FOREIGN PATENT DOCUMENTS

WO WO-9320443 A1 * 10/1993 ........... G01N 21/253
WO 2016/081594 A1 5/2016

OTHER PUBLICATIONS

International Search Report dated Jun. 4, 2018, in Application No. PCT/EP2018/054495, 5 pp.

*Primary Examiner* — Jill A Warden
*Assistant Examiner* — John McGuirk
(74) *Attorney, Agent, or Firm* — Roche Diagnostics Operations, Inc.

(57) ABSTRACT

An automated analyzer system for biological samples is provided and includes a sample processing system and a controller configured to receive a selection of one of multiple workflows for determining a presence and/or concentration of an analyte in a biological sample and prompt the automated analyzer system to automatically carry out the selected workflow using the sample processing system and output a result classifying the biological sample.

22 Claims, 4 Drawing Sheets

(56) References Cited

U.S. PATENT DOCUMENTS

| | | |
|---|---|---|
| 2005/0197366 A1 | 9/2005 | Chia et al. |
| 2007/0038406 A1 | 2/2007 | Uemura et al. |
| 2010/0113285 A1 | 5/2010 | Kao et al. |
| 2010/0314316 A1 | 12/2010 | Yin et al. |
| 2012/0202226 A1 | 8/2012 | Yahalom et al. |
| 2013/0029338 A1 | 1/2013 | Jovanovich et al. |
| 2014/0373642 A1 | 12/2014 | Suzuki et al. |
| 2016/0331829 A1 | 11/2016 | Edwards et al. |
| 2017/0022515 A1 | 1/2017 | Wright et al. |

* cited by examiner

SYSTEMS AND METHODS FOR CLASSIFYING A BIOLOGICAL SAMPLE REGARDING THE PRESENCE OF AN ANALYTE

CROSS-REFERENCE TO RELATED APPLICATIONS

This application is a continuation of International Patent Application No. PCT/EP2018/054495, filed 23 Feb. 2018, which claims the benefit of European Patent Application No. 17158679.5, filed 1 Mar. 2017, the disclosures of which are hereby incorporated herein by reference in their entirety.

TECHNICAL FIELD

This disclosure relates to systems and methods for classifying a biological sample regarding the presence of an analyte. In particular, systems and methods for confirmation testing of biological samples are presented.

BACKGROUND

Nowadays, testing a biological sample regarding the presence of an analyte can be performed by automated analyzers in many situations. In one example, the presence of HBV surface antigen ("HBsAg") which can be indicative of an acute or chronic infection with the hepatitis B virus ("HBV") can be detected by an automated analyzer (e.g., in the course of a screening or diagnostic test). In case of a positive result for a biological sample, a confirmation test of the sample is desired or required in many situations to, e.g., lower the probability of false positive results which might have severe consequences for the patients, in particular in the blood screening environment.

Confirmation testing can be a cumbersome procedure, as it might involve a considerable number of sample preparation and protocol selection steps. On the one hand, different confirmation test protocols might be warranted in different situations. In some known systems, an operator has to figure out how to set up the confirmation test in a particular situation, including calculations of required amounts of sample and reagent volumes. This can be an intellectually challenging task. In addition, performing the steps of the confirmation test can involve a plurality of sample preparation and pretreatment steps that have to be done manually in some known systems. Last, an operator might have to interpret the results of the confirmation test in some known systems.

Each of these tasks and even more their combination can be error prone and require a considerable amount of laboratory resources (first and foremost, a considerable amount of labor time of the laboratory personnel might be needed).

BRIEF SUMMARY

It is against the above background that the embodiments of the present disclosure provide certain unobvious advantages and advancements over the prior art. In particular, the inventors have recognized a need for improvements in systems and methods for classifying a biological sample regarding the presence of an analyte.

In accordance with one embodiment of the present disclosure, an automated analyzer system for biological samples is provided, comprising: a sample processing system; a controller configured to: receive a selection of one of multiple workflows for determining a presence and/or concentration of an analyte in a biological sample; prompt the automated analyzer system to automatically carry out the selected workflow using the sample processing system; and output a result classifying the biological sample; and wherein each of the multiple workflows is assigned to a value or a range of values of a measured parameter indicative of a presence and/or concentration of the analyte and defines a plurality of steps to be carried out by the automated analyzer system, the plurality of steps including: preparing at least a first and a second sample aliquot from a biological sample with particular levels of dilution, the first sample aliquot being a confirmation aliquot and the second sample aliquot being a control aliquot; adding predefined quantities of one or more agents to specifically determine the presence of said analyte to the confirmation aliquot and the control aliquot; determining a parameter indicative of a presence and/or concentration of the analyte in the confirmation aliquot and in the control aliquot; determining a relationship of the determined parameters of the analyte in the confirmation aliquot and in the control aliquot; and based on the determined relationship, classifying the biological sample in one of a plurality of classes regarding the presence of the analyte, wherein the confirmation aliquot includes a neutralization agent to reduce an effect of an agent to determine the presence of the analyte, and wherein the control aliquot includes a substance which does not substantially change the characteristics of the second sample aliquot.

In accordance with another embodiment of the present disclosure, a computer implemented method is provided, comprising: receiving a selection of one of multiple workflows for determining a presence and/or concentration of an analyte in a biological sample; prompting an automated analyzer system to automatically carry out the selected workflow using a sample processing system; and outputting a result classifying the biological sample; wherein each of the multiple workflows is assigned to a value or range of values of a measured parameter indicative of a presence and/or concentration of the analyte and defines a plurality of steps to be carried out by the automated analyzer system, the plurality of steps including: preparing at least a first and a second sample aliquot from a biological sample with particular levels of dilution, the first sample aliquot being a confirmation aliquot and the second sample aliquot being a control aliquot; adding predefined quantities of one or more agents to specifically determine the presence of said analyte to the confirmation aliquot and the control aliquot; determining a parameter indicative of a presence and/or concentration of the analyte in the confirmation aliquot and in the control aliquot; determining a relationship of the determined parameters of the analyte in the confirmation aliquot and in the control aliquot; and based on the determined relationship, classifying the biological sample in one of a plurality of classes regarding the presence of the analyte, wherein the confirmation aliquot includes a neutralization agent to reduce an effect of an agent to determine the presence of the analyte, and wherein the control aliquot includes a substance which does not substantially change the characteristics of the second sample aliquot.

These and other features and advantages of the embodiments of the present disclosure will be more fully understood from the following description in combination with the drawings and the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
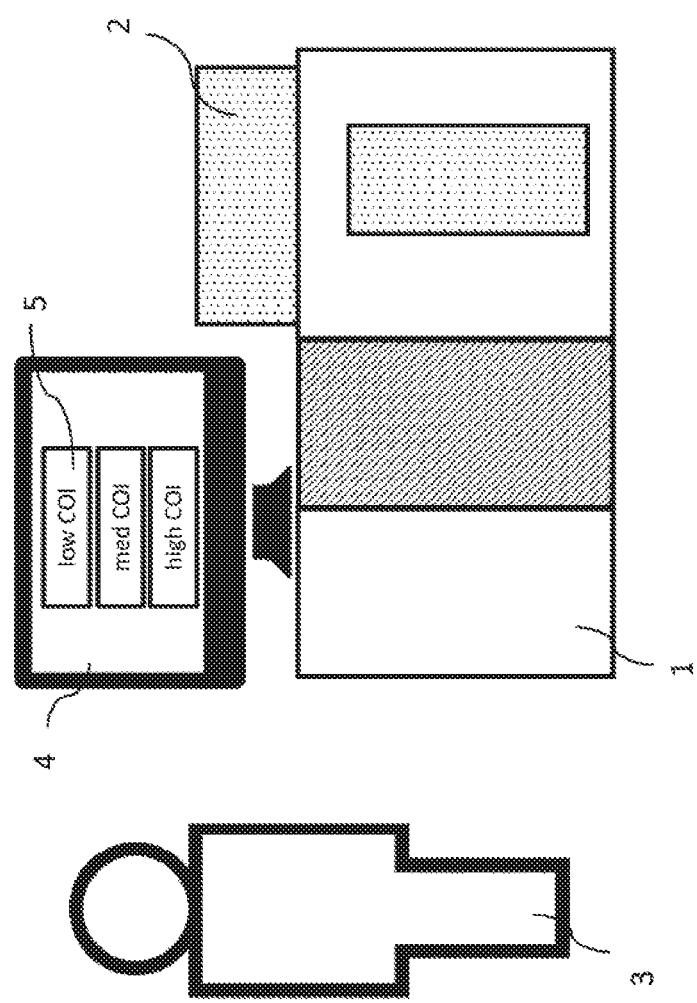
FIG. 1 includes a schematic illustration of an automated analyzer system for biological samples according to the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

In accordance with an embodiment of the present disclosure, an automated analyzer system for biological samples includes a sample processing system and a controller configured to receive a selection of one of multiple workflows for determining a presence and/or concentration of an analyte in a biological sample, prompt the automated analyzer system to automatically carry out the selected workflow using the sample processing system and output a result classifying the biological sample. Each of the multiple workflows is assigned to a value or a range of values of a measured parameter indicative of a presence and/or concentration of the analyte and defines a plurality of steps to be carried out by the automated analyzer system. The plurality of steps include preparing at least a first and a second sample aliquot from a biological sample with particular levels of dilution, the first sample aliquot being a confirmation aliquot and the second sample aliquot being a control aliquot, adding predefined quantities of one or more agents to specifically determine the presence of said analyte to the confirmation aliquot and the control aliquot, determining a parameter indicative of a presence and/or concentration of the analyte in the confirmation aliquot and in the control aliquot, determining a relationship of the determined parameters of the analyte in the confirmation aliquot and in the control aliquot and, based on the determined relationship, classifying the biological sample in one of a plurality of classes regarding the presence of the analyte.

In accordance with another embodiment of the present disclosure, a computer implemented method includes receiving a selection of one of multiple workflows for determining a presence and/or concentration of an analyte in a biological sample, prompting an automated analyzer system to automatically carry out the selected workflow using a sample processing system and outputting a result classifying the biological sample. Each of the multiple workflows is assigned to a value or a range of values of a measured parameter indicative of a presence and/or concentration of the analyte and defines a plurality of steps including preparing at least a first and a second sample aliquot from a biological sample with particular levels of dilution, the first sample aliquot being a confirmation aliquot and the second sample aliquot being a control aliquot, adding predefined quantities of one or more agents to specifically determine the presence of said analyte to the confirmation aliquot and the control aliquot, determining a parameter indicative of a presence and/or concentration of the analyte in the confirmation aliquot and in the control aliquot, determining a relationship of the determined parameters of the analyte in the confirmation aliquot and in the control aliquot and, based on the determined relationship, classifying the biological sample in one of a plurality of classes regarding the presence of the analyte.

Although the embodiments of the present disclosure are not limited to specific advantages or functionality, it is noted that firstly, the techniques of the present disclosure can reduce a workload of an operator of automated analyzer by automation of different aspects of a confirmation test of a biological sample in some examples. In particular, some prior art systems require intellectually taxing decision steps regarding how to perform a confirmation test and cumbersome manual preparation steps of the control and confirmation aliquots.

Secondly, the techniques of the present disclosure can reduce a number of errors when performing a confirmation test in some examples. As discussed above, some prior art systems' confirmation tests include intellectually and manually challenging steps to be carried out by operators of the automated analyzers. This might lead to a considerable number of errors which can have different consequences ranging from having to repeat the test (which might involve obtaining a new sample) to false results (which might have severe consequences for a patient). By providing automation and automated decision support, the techniques of the present disclosure can reduce a frequency/number of these errors in some situations.

Thirdly, the techniques of the present disclosure can reduce an exposure of laboratory personnel to infectious substances or working environments. In some examples, an operator might not have to handle a sample in the process of performing a confirmation test when employing the techniques of the present disclosure. For instance, a conformation test can be carried out without user interaction by the automated analyzer in some examples. Moreover, the confirmation test can also be triggered automatically in some examples which can further reduce the operator's exposure to infectious substances or working environments.

Fourthly, a sample consumption in the confirmation test can be reduced in some examples. This, in turn, can mean that a required sample and reagent volume for performing a confirmation test can be reduced in some situations when using the techniques of the present disclosure. For instance, sample consumption of 50 μL or less can be sufficient to carry out a confirmation test. Reagent volumes and volumes of other involved substances can be accordingly low. Thus, an amount of bodily substance that has to be obtained from a patient can be reduced in some situations. In other cases, working with lower sample volumes might avoid that a second sample has to be taken from a patient for performing the confirmation test.

Fifthly, the automation of the confirmation test might allow modifications of protocols of confirmation tests that are performed manually in some known systems. These known protocols might include safeguards (e.g., repeated testing of samples) which are in part motivated by the fact that the manually executed process might be error prone. In addition, the manual steps in the known protocols might make particular modifications difficult or impossible to achieve. The so modified protocols might be simpler and thus more time and resource efficient in some examples (e.g., a number of tests for determining a cutoff index can be reduced). However, it should be pointed out that testing of biological samples, particularly for infectious diseases, might be subject to different regulations in different countries. Therefore, particular protocols and protocol steps might be required by regulation.

Sixthly, the automated analyzer can increase efficiency and/or time-to-result of the testing procedure in some examples. A confirmation test can be automatically started when a sample is found to be reactive. In this manner, a time-to-result might be shortened compared to some known systems.

A number of terms are used in the present disclosure in a particular way:

The terms 'automated'/'automatically' as used in the present disclosure mean "without user interaction except for operations triggering or stopping a particular procedure or step of a procedure, or confirming that a particular step of a procedure shall be executed." In other words, an automated/automatic processing does not mean that there is no user interaction at all (even though this case is also encompassed by the terms 'automated'/'automatically'). Rather, the possible user interactions are limited to starting/stopping a process or a step of a process. For example, in some examples an operator might have to confirm that a particular workflow of a confirmation test shall be carried out, or that a particular step of a confirmation test shall be carried out. The operator merely confirms/rejects that a process shall be carried out but does not take part in the actual execution.

The term 'automated analyzer' as used herein can refer to any kind of automated or semi-automated technical device for use in laboratory work, e.g., in the clinical, chemical, biological, immunology or pharmaceutical area or the like used for performing a confirmation test on a biological sample in-vitro.

In the present disclosure, automated analyzers for performing hepatitis B virus ("HBV") confirmation tests will be discussed. This means that the analyte is the HBV surface antigen ("HBsAg"). However, the techniques of the present disclosure are not limited to HBV confirmation tests. In other examples, the automated analyzers are configured to perform confirmation tests for other diseases or conditions (as long as the techniques of the present disclosure can be applied in the respective confirmation test). Several possible implementations of an automated analyzer will be discussed in the following paragraphs.

In general, an automated analyzer may comprise components to perform fluid transfer and dosing, fluid homogenization (mixing), temperature control, and measurements of chemical or physical parameters. For example, the devices can include fluid dispensing components (e.g., a pipettor or a valve), a stirrer, a tempering device, a shaker, and/or an agitator.

In other examples, automated analyzers can include an analysis system or a work-cell of an analysis system or analyzer. For example, an automated analyzer can be an analyzer for analyzing a mechanical, optical, chemical or biological property of a sample.

'Analyzers' are not necessarily located in a dedicated laboratory. Rather, the term also includes stand-alone analyzers for carrying out analytic procedures, e.g., in the clinical, chemical, biological, immunology or pharmaceutical area. For example, a benchtop device in point-of-care settings such as physician clinics or pharmacies or a device for home-use can also be automated analyzers according to the present disclosure.

'Analyzers' as used herein comprise a control unit or a controller operatively coupled to control the operations of the analyzer. In addition, the controller may be operable to evaluate and/or process gathered analysis data, to control the loading, storing and/or unloading of samples to and/or from any one of the analyzers, to initialize an analysis or hardware or software operations of the analysis system used for preparing the samples, sample tubes or reagents for said analysis and the like.

An analyzer can be operable to determine via various chemical, biological, physical, optical or other technical procedures a parameter value of the sample or a component thereof (e.g., a cutoff index for a sample including HBsAg as analyte via an optical signal emitted from the sample).

An analyzer may be operable to measure said parameter of the sample or of at least one analyte and return the obtained measurement value. The list of possible analysis results returned by the analyzer comprises, without limitation, concentrations of the analyte in the sample, a digital (e.g., yes or no, or positive or negative) result indicating the existence of the analyte in the sample (corresponding to a concentration above the detection level), optical parameters, images, cell or particle counts, DNA or RNA sequences, data obtained from mass spectrometry of proteins or metabolites and physical, mechanical, optical, electrical or chemical parameters of various types.

An automated analyzer may comprise units assisting with the pipetting, dosing, and mixing of samples and/or reagents. The analyzer may comprise a reagent-holding unit for holding reagents to perform assays (in particular for performing a confirmation test). Reagents may be arranged, e.g., in the form of containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis.

In general, examples of such analyzer are clinical chemistry analyzers, coagulation chemistry analyzers, immunochemistry analyzers, urine analyzers, nucleic acid analyzers, used to detect the result of chemical or biological reactions or to monitor the progress of chemical or biological reactions. In one example, the analyzer can be configured to carry out immunoassays (e.g., immunoassays based on micro-particles).

In the present disclosure, an 'automated analyzer' or 'analyzer' is part of a unit being the 'automated analyzer system.' In some examples, the 'automated analyzer system' can consist of only the automated analyzer itself. However, in other examples, an 'automated analyzer system' can additionally include other components that are coupled to and/or networked with the automated analyzer (e.g., through a communication network) and take part in carrying out the techniques of the present disclosure. These other components can be local to and/or remote from the automated analyzer in which the sample processing takes place. For example, a laboratory or hospital management system can be coupled to or networked with the automated analyzer and control functions of the automated analyzer. In other examples, a portable device or a remote workstation can be networked with the automated analyzer to provide control functions for the automated analyzer. The automated analyzer system can also include multiple distributed automated analyzers in some examples to carry out the tests of the present disclosure.

The term 'biological sample' or 'sample' refers to material(s) that may potentially contain an analyte of interest. The sample can be derived from a biological source, such as a physiological fluid, including whole blood, plasma, serum, saliva, ocular lens fluid, cerebrospinal fluid, sweat, urine, stool, semen, milk, ascites fluid, mucous, synovial fluid, peritoneal fluid, amniotic fluid, tissue, cells, or the like. The biological sample can be pretreated prior to use. Pretreatment can involve centrifugation, filtration, dilution, concentration and/or separation of sample components including analytes of interest, inactivation of interfering components, and the addition of reagents.

A sample may be used directly as obtained from the source or used following a pretreatment to modify the character of the sample. In some embodiments, an initially solid or semi-solid biological material can be rendered liquid by dissolving or suspending it with a suitable liquid medium. In some examples, the sample can be suspected to contain a certain antigen or nucleic acid.

A sample can be treated before analytical testing is done. Blood sampled from a patient can, e.g., be centrifuged to obtain serum or treated with anti-coagulants to obtain plasma.

In the present disclosure, samples derived from blood (e.g, serum or plasma sample) for use in an HBV confirmation test will be discussed in detail. However, the techniques of the present disclosure are not limited to blood samples or samples derived from blood. In other examples, other biological samples can be used to perform confirmation tests (as long as the techniques of the present disclosure can be applied to detect a presence of the respective analyte).

The term 'analyte' as used in the present disclosure refers to a substance or constituent that is of interest in an analytical procedure. In some examples, an analyte can be a protein. For instance, an analyte can be a pathogen (e.g., a virus, a bacterium or a micro-organism), or an antibody produced in reaction to an infection by a pathogen (e.g., a virus, a bacterium or a micro-organism). In the present disclosure, hepatitis B surface antigen ("HBsAg") is described as analyte in the majority of the examples. However, the techniques of the present disclosure are not limited to hepatitis B surface antigen as analyte.

In other examples, other analytes potentially present in the biological samples can be used as targets in confirmation tests (as long as the techniques of the present disclosure can be applied to process the respective sample). For examples, analytes indicative of other infectious diseases than hepatitis B, or analytes indicative of other conditions than infectious diseases can be detected in some examples.

The expression 'presence of an analyte' refers to a qualitative measurement of an analysis (e.g., including a binary decision that an analyte is present). The expression 'concentration of an analyte' refers to a quantitative measurement (e.g., including a determination that an analyte is present in a certain concentration).

The term 'agent' as used in the present disclosure is not limited to situations where the agent includes only a single (active) substance. An 'agent' can also include two or more (active) substances. In addition, an agent might include a kit of substances prepared to be used in a plurality of steps (which might take place parallel, in series, subsequently and/or with interleaved other steps).

Accordingly, 'adding an agent' can include a plurality of sub-steps which can be carried out in parallel or in series. In addition, 'adding an agent' covers situations where a plurality of steps are carried in direct succession, or interrupted by other steps (e.g., incubation steps).

In one example, an agent can include various types of reagents that are required to carry out an analytical in vitro diagnostic test (e.g., a sandwich assay). For example, an agent can include the reagents that are required to specifically determine the analyte, e.g., binding partners such as antibodies that specifically bind to the analyte. One group of these analyte-specific binding partners or antibodies can be labeled to make sure that the analyte can be determined via a detectable signal and another group of analyte-specific binding partners or antibodies is capable of being attached to a solid phase such as to microparticles.

An agent can also be a neutralization agent that can contain analyte-specific binding partners in an unlabeled form.

The term agent also covers control agents that does not contain any analyte-specific binding partners or antibodies (e.g., human serum tested negative for the analyte or a buffer solution). In some examples, an agent also includes additional ingredients to elicit a particular result (e.g., solid phase particles, buffers, salts, etc.).

The term 'particular level of dilution' as described herein encompasses a situation where there is no dilution (i.e., the level of dilution is zero).

A 'control unit' or 'controller' controls the automated or semi-automated system in a way that the necessary steps for the processing protocols are conducted by the automated system. That means the controller may, for example, instruct the automated system to conduct certain pipetting steps to mix the liquid biological sample with reagents, or the controller controls the automated system to incubate the sample mixtures for a certain time, etc. The control unit may receive information from a data management unit regarding which steps need to be performed with a certain sample. In some embodiments, the controller might be integral with the data management unit or may be embodied by a common hardware. The controller may, for instance, be embodied as a programmable logic controller running a computer-readable program provided with instructions to perform operations in accordance with a process operation plan. The controller may be set up to control, for example, any one or more of the following operations: loading and/or wasting and/or washing of cuvettes and/or pipette tips, moving and/or opening of sample tubes and reagent cassettes, pipetting of samples and/or reagents, mixing of samples and/or reagents, washing pipetting needles or tips, washing mixing paddles, controlling of a light source, e.g., selection of the wavelength, or the like. In particular, the controller may include a scheduler, for executing a sequence of steps within a predefined cycle time. The controller may further determine the order of samples to be processed according to the assay type, urgency, and the like.

The term 'communication network' as used herein encompasses any type of wireless network, such as a WIFI, GSM, UMTS or other wireless digital network or a cable based network, such as Ethernet or the like. In particular, the communication network can implement the Internet protocol (IP). For example, the communication network comprises a combination of cable-based and wireless networks.

Unless specified otherwise, the terms 'about', 'substantially' and 'approximately' as used herein can refer to a deviation of +/−10% of the indicated value. If two values are 'substantially' or 'approximately' equal, this can mean that the values differ by at most 10% (determined starting from the smaller value).

The methods and systems for classifying a biological sample regarding the presence of an analyte according to the present disclosure will subsequently be discussed in more detail.

First, an example automated analyzer system will be discussed in connection with FIG. 1. Subsequently, aspects of the workflows that can be carried out by the automated analyzer systems according to the present disclosure which can involve a confirmation test or a combination of a diagnostic or screening test and a confirmation test will be discussed in connection with FIG. 2 to FIG. 4.

Automated Analyzer System

FIG. 1 illustrates an example automated analyzer system 1 according to the present disclosure. An operator 3 can monitor and control the automated analyzer system 1 by means of a user interface 4. In the example of FIG. 1 the user interface 4 is a monitor of the automated analyzer system 1. However, the user interface can be any other device suitable to output information regarding the state of the automated analyzers system 1 and for allowing user input to the automated analyzer system. For example, a user interface can be provided on a mobile device or a remote device (e.g., a laptop or smartphone). In addition, or alternatively, a user interface not necessary is a graphical user interface on a display but can also be provided through other channels (e.g., the operator 3 can input instructions through voice or gesture commands).

In addition, the automated analyzer system 1 includes a sample processing system 2 configured to carry out the automated sample processing steps according to the present disclosure. In one example, the sample processing system 2 can be equipped with one or more dispensing units (e.g., pipetting units—not shown in FIG. 1) for taking aliquots of samples, adding diluents and reagents and other sample pre-treatment manipulation operations.

In addition, the sample processing system 2 can include a measurement unit for sensing a parameter of the sample (e.g., a photometer or other optical measurement units). In addition, or alternatively, the automated analyzer system can include any of the components discussed in the summary section above.

In one example, the automated analyzer system 1 is configured to use the sample processing system 2 to carry out the confirmation test and a screening or diagnostic test on the biological sample. Based on the results of the tests, a biological sample can be classified (e.g., as 'reactive' or 'non-reactive'). Before continuing with discussing the components of the automated analyzer system 1 according to the present disclosure, background information regarding screening or diagnostic tests will be given subsequently.

As discussed above, the automated analyzer system can carry out in vitro tests on biological samples to detect the presence and/or concentration of a particular analyte (or of more than one analyte).

In some examples, the tests for determining the presence of an analyte in a biological sample provide a value obtained for a physically or chemically measurable parameter (e.g., an absorption signal or an emission signal). These diagnostic or screening tests can have continuous results that are measured on a scale. In order to decide whether a measured value is classified as 'normal' (or 'negative' or 'non-reactive') or as 'pathologic' (or 'positive' or 'reactive'), criteria can be defined that separate the normal range from the pathologic or abnormal range.

In some examples (particular in the field of infectious diseases) such criteria can include a threshold. If the measured parameter ranges below the threshold, a sample is regarded as non-reactive or negative. If the measured parameter ranges above the threshold, a sample is classified as reactive or positive. An example of such threshold is the so-called "cutoff" which is a dividing point on a measuring scale that is set for test procedures in order to differentiate between positive and negative values.

Said threshold can be selected in such that the test still provides a predefined high sensitivity (high true positive rate) but at the same time also ensures a predefined high specificity (high true negative rate) so that false positive and false negative results are avoided. Depending on the test design and in order to avoid false positive results the cutoff value can be defined as a multiple of the background signal or as a multiple of the result of a normal (negative) sample.

In some examples, results of tests are provided in the form of a "cutoff index" (COI) which can be a ratio of a result signal obtained for a sample divided by the predefined cutoff value, resulting in a signal sample/cutoff ratio.

In particular, in infectious diseases diagnostics, a cutoff and a calculated COI can be chosen in such a way that a high sensitivity and a high specificity of an assay are achieved, i.e., ideally all positives have to be detected and among those positives there should not be any false positives, or at least as few false positives as possible. In many cases, sensitivity and specificity for most highly regulated infectious disease testing is at least 98% (e.g., ranging from 98 to 99.95%).

Returning to FIG. 1, the automated analyzer system 1 can be configured to present two or more workflows 5 for confirmation tests to be carried out by the automated analyzer system on the user interface 4, and receive a selection of the one of the workflows 5 to be carried out through the user interface 4. The automated analyzer system is configured to execute the selected workflow of the confirmation test in automated manner. The workflow can be stored on the automated analyzer system or received by the automated analyzer system in suitable manner (e.g., as software, hardware, or a combination of both). In one example, the workflows are defined as part of the analyzer system's factory setup. In other examples, the workflows can be provided to the analyzer system after deployment of the analyzer system in the field through a communication network.

Additional aspects regarding this process and the structure of the workflows will be given subsequently (particularly in connection with FIG. 2).

In other examples, the automated analyzer system can be configured to automatically select a workflow for a confirmation test (i.e., the operator does not have to select the workflow that shall be executed). Details regarding these examples will also be discussed below (particularly in connection with FIG. 3).

Confirmation Test with User Selection of Workflow

Figure 2:
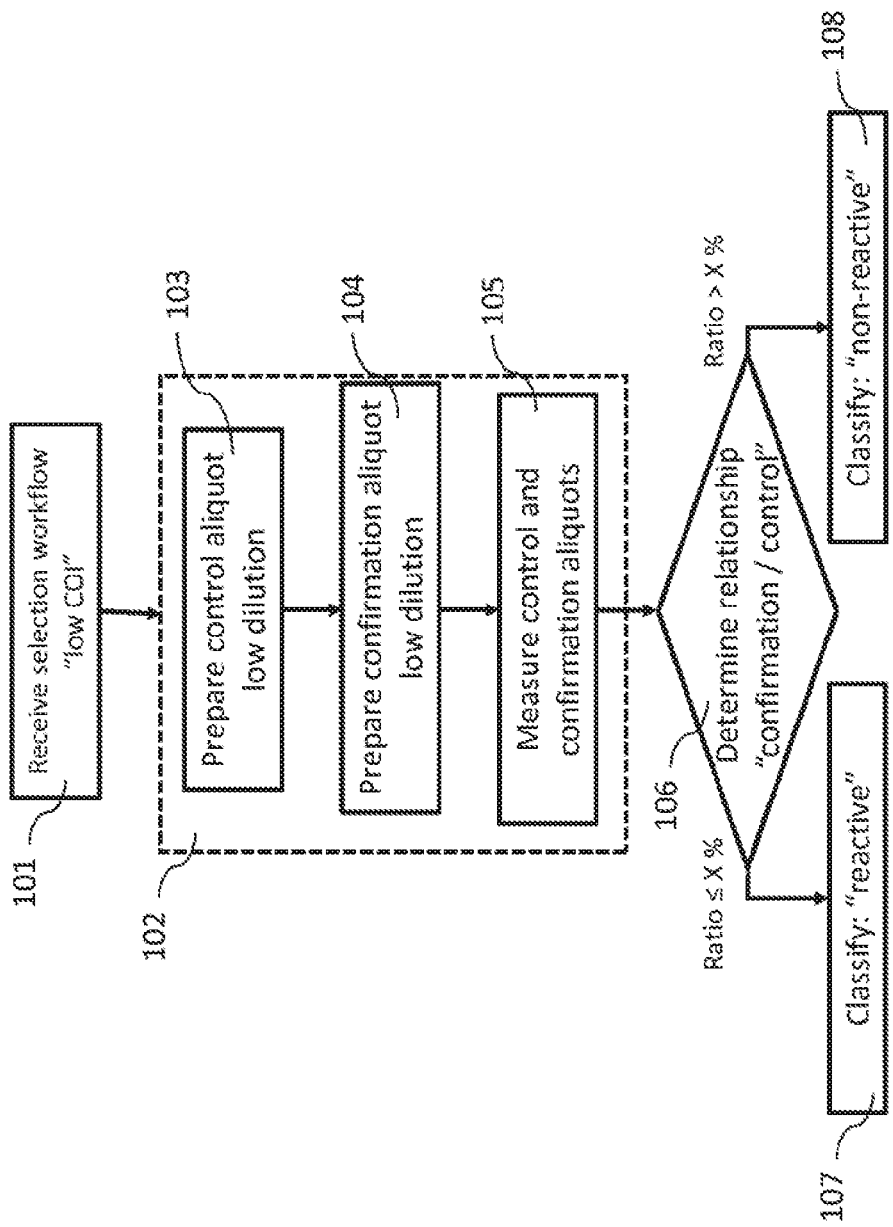
FIG. 2 includes a flow diagram of an example workflow according to the present disclosure.

FIG. 2 includes a flow diagram of an example workflow for a confirmation test (an HBV confirmation test in the present example) according to the present disclosure. This workflow can be carried out by the automated analyzer system in an automated manner.

In the example of FIG. 2, an HBV screening or diagnostic test might have yielded a positive (reactive) result for a particular biological sample. To confirm this finding, a confirmation test is ordered.

In the automated analysis system of the present disclosure, the operator can select one of multiple workflows provided by the automated analysis system for performing the confirmation test. In one example, as shown in FIG. 1, the user interface of the automated analyzer system can present a selection (e.g., one or more) of the multiple workflows or all multiple workflows (e.g., presenting respective graphical representations on the user interface). The selection is received at the automated analyzer system, which subsequently prompts the automated analyzer system to automatically carry out the selected workflow using the sample processing system.

As depicted in FIG. 2, each of the multiple workflows defines a plurality of steps to be carried out by the automated analyzer system. Each workflow is assigned to a value or a range of values of the measured parameter indicative of a presence and/or concentration of an analyte in the biological sample. In FIG. 2, the workflow is assigned to a "low COI" range (e.g., the COI determined for the biological sample is equal to or below a predetermined (first) threshold). The other workflows of the multiple workflows provided by the automated analyzer systems might be assigned to other COI ranges.

In one example, a second workflow can be assigned to a high COI range (e.g., the COI determined for the biological sample is above a predetermined (second) threshold). In addition, one or more third workflows can be assigned to an intermediate range of COIs (e.g., the COI determined for the biological sample is above the first threshold and equal to or below the second threshold).

As discussed above, the COI is only one possible measured parameter indicative of a presence and/or concentration of the analyte in the biological sample. Even though the COI will be used as parameter in the subsequent examples, the techniques of the present disclosure can also be employed with other parameter indicative of a presence and/or concentration of the analyte in the biological sample. For example, the presence and/or concentration of an analyte can be expressed also in concentration units (e.g. mol/L or mg/L) or a percentage.

In the example of FIG. 2, a set of workflows for the confirmation test is provided by the automated analyzer system. In still other examples, the multiple workflows can be defined by a single workflow parameterized by one or more parameters. In these examples, selecting one of the multiple workflows includes specifying the one or more parameters. For example, an operator can select a workflow by specifying a COI of the biological sample in some examples. For example, the COI determined for the biological sample might be 7.5 so the operator could input this value in the automated analyzer system.

Returning to FIG. 2, the automated analyzer system can receive a selection of the workflow (at 101). At 103 and 104, the automated analyzer automatically prepares at least a first and a second sample aliquot from a biological sample under consideration, the first sample aliquot being a confirmation aliquot and the second sample aliquot being a control aliquot. The automated analyzer system can perform all necessary steps in an automated manner.

Sample Handling Prior to Measurement

The preparation of sample aliquots can involve diluting the confirmation and control aliquots to particular levels of dilution defined in the respective workflow. As discussed above, each workflow defines a predetermined level of dilution the automated analyzer system uses if the respective workflow is selected. The multiple workflows can also include one or more workflows for which there is no dilution (i.e., the level of dilution is zero). However, one or more workflows always define a non-zero level of dilution.

In particular embodiments, the diluting step or steps can include adding of diluting agents, (e.g., buffers, normal serum), and other substances (e.g., chemical substances, antibodies, antigens, anti-interference compounds, preservatives etc.) to a sample.

Moreover, the diluting step can include one or more steps of a pretreatment procedure prior to determination of the analyte (e.g., adding detergents to the sample aliquots required to free an analyte of interest).

In some examples, the particular levels of dilution are defined based on the respective value or the range of values of the measured parameter indicative of a presence and/or concentration of the analyte the respective workflow is assigned to (e.g., a COI value or range of COI values the workflow is assigned to). For instance, the particular levels of dilution include at least one lower dilution (e.g., for a lower range of COIs), one intermediate dilution (e.g., for an intermediate range of COIs) and one higher dilution (e.g., for a high range of COIs).

In one particular example, there can be three workflows: a first workflow for a COI lower than 7.0, a second workflow for a COI equal or higher than 7.0 and lower than 30, and a third workflow for a COI equal or higher than 30. In this example, the workflows for the COIs of less than 30 might define a dilution level of zero while the workflow for COI equal or higher than 30 might define a non-zero level of dilution.

The preparation of the control and confirmation aliquots can include one or more additional steps.

For example, the preparation of the confirmation sample can include adding a neutralization agent to the first sample aliquot to prepare the confirmation aliquot. The neutralization agent can be selected to reduce an effect of an agent to determine the presence of said analyte. In one example, the neutralization agent can include unlabeled antibodies which are selected to bind to the analyte but cannot produce a measurable signal. For instance, human serum with a pre-defined amount of (unlabeled) anti-HBs antibodies can be employed in some examples.

The preparation of the sample aliquots can include adding a control agent to the second sample aliquot to prepare the control aliquot. In one example, the control agent can be a substance which does not substantially change the characteristics of the control aliquot. The control agent can be a buffer solution. For instance, the control agent can be human serum which has been tested negative for anti-HBs antibodies and Hepatitis B surface antigens (the analyte itself).

In other examples, a control agent might not be required in the control aliquot. For instance, the automated analyzer system can be configured to correct for a difference (e.g., a dilution and/or volume difference) between the control and confirmation aliquots by virtue of a correction algorithm.

The order of the steps discussed above for preparing the control aliquot and the confirmation aliquot is flexible to some extent. For instance, the dilution step can be performed prior to the aliquoting step, or the dilution steps can be performed after the aliquoting steps. In many examples, the aliquots are taken prior to the dilution steps.

In addition, or alternatively, the preparation of the control and confirmation aliquots can also include additional steps to the steps discussed above prior to and/or following the aliquoting operation (e.g., incubation steps or steps of adding additional reagents).

The preparation of the confirmation aliquot and the control aliquot can happen in parallel in some examples. In other examples, the automated analyzer might prepare the aliquots sequentially.

General Measurement Process for Confirmation and Control Aliquots

In an additional step (not shown in FIG. 2), the automated analyzer system adds predefined quantities of one or more agents to specifically determine the presence of said analyte to the confirmation aliquot and the control aliquot. In one example, the automated analyzer system adds one or multiple types of labelled antibodies configured to bind to the analyte in the respective aliquots.

After the control and the confirmation aliquot have been prepared and the one or more agents to specifically determine the presence of said analyte has been added, the automated analyzer determines a parameter indicative of a presence and/or concentration of the analyte in the confirmation aliquot and in the control aliquot (105). In some examples, this parameter is a COI. The order of the preparation and determining operation might also be different in other examples (the respective sample preparation steps for a particular sample naturally have to be completed before determining the parameter for this sample).

In one example, the adding of the predefined quantities of one or more agents to specifically determine the presence of said analyte to the confirmation aliquot and the control aliquot step and the determination step might include the following procedure.

Determination of COI for Samples Including Hepatitis Surface Antigen (HBsAg) as Analyte The procedure starts with receiving the confirmation aliquot and the control aliquot (which can be prepared as discussed above).

The analyte in this example procedure is a hepatitis surface antigen (HBsAg), so the determination step includes automatically carrying out an HBsAg assay. The assay can be based on the sandwich format including two incubations as following. In the course of the process, the analyte is bound between biotinylated anti-HBs antibodies and anti-HBs antibodies labeled with a signal generating component (e.g., ruthenium complex: Tris(2,2'-bipyridyl)ruthenium(II)-complex (Ru(bpy)32+) (i.e., an agent to specifically determine the presence of the analyte)). The neutralization agent for the confirmation aliquot includes unlabeled antibodies competing with the labelled antibodies. The control agent for the control aliquot can be a human serum tested negative for anti-HBs antibodies and HBsAg or a buffer solution. Therefore, in the confirmation aliquot a lower number of sandwich complexes including the label will form than in the control sample (if the biological sample is positive for the hepatitis surface antigen (HBsAg)).

The process includes a first incubation step of a quantity (e.g., 50 µL) of a human serum or plasma sample prepared with the above described anti-HBs antibodies. This incubation step forms sandwich immunocomplexes with the analyte HBsAg in the control aliquot and a lower amount of sandwich immunocomplexes in the confirmation aliquot (in case the HBsAg is present in the biological sample). In a second incubation step, the analyzer adds streptavidin-coated microparticles and the complex becomes bound to the solid phase via interaction of biotin and streptavidin.

The so prepared reaction mixture is aspirated into a measuring cell of the sample processing system where the microparticles are magnetically captured onto the surface of an electrode. Unbound substances are then removed by adding an appropriate reagent (e.g., a buffered tripropylamine solution).

In the presence of analyte, the ruthenium complex is bridged to the solid phase and emits light at 620 nm after excitation at a platinum electrode comprised in a measuring cell of the sample handling system of the automated analyzer. The confirmation aliquot emits a lower amount of light due to the fact that a quantity of HBsAg is not incorporated in light emitting complexes. The signal output can be in arbitrary light units. The controller of the analyzer automatically determines the results by the software by comparing the electrochemiluminescence signal obtained from the reaction product of the sample with the signal of the cutoff value previously obtained by calibration. A cutoff index (COI) can be determined (as discussed above) for the control aliquot and the confirmation aliquot.

Returning to FIG. 2, after the automated analyzer has determined the parameter indicative of a presence and/or concentration of the analyte in the confirmation aliquot and in the control aliquot (e.g., a COI for both samples), the analyzer determines a relationship of the determined parameters of the analyte in the confirmation aliquot and in the control aliquot (106). In one example, this step includes calculating a ratio of the determined parameter of the analyte in the confirmation and the control aliquots (e.g., the COI values). In the example of FIG. 2, the ratio is calculated as "COI of the confirmation aliquot" divided by "COI of the control aliquot."

In other examples, the relationship can be determined in a different manner. For instance, the ratio could be reversed, or another relationship instead of ratio could be used (e.g., the determined parameters of the control and confirmation aliquots could be subtracted). In addition, determining the relationship can include one or more pre- or post-processing steps of signals measured by a detection unit of the sample processing system of the automated analyzer system.

After the relationship has been determined, the automated analyzer system automatically classifies the biological sample in one of a plurality of classes regarding the presence of the analyte based on the determined relationship.

In FIG. 2, the automated analyzer classifies the sample in one of two classes: A first class indicates that the biological sample is reactive (e.g., a result of an initial diagnostic or screening test is confirmed). A second class indicates that the biological sample is not reactive (e.g., a result of an initial diagnostic or screening test is not confirmed).

In the example of FIG. 2, the automatic classification includes determining if the ratio of the COIs is equal or below or above a predetermined threshold. In the former case (COI is equal or below said threshold), the automated analyzer system classifies the biological sample as reactive (step 107). In the latter case (COI is above said threshold), the automated analyzer classifies the biological sample as non-reactive (step 108). A lower ratio of the COIs might indicate that the biological sample indeed includes the target analyte, as adding the neutralization agent has a substantial effect on the signal strength. A higher ratio of the COIs might indicate that adding the neutralization agent had no substantial effect and, in turn, the biological sample might not include the targeted analyte. In one example, the threshold ratio might be between 0.5 and 0.7 (e.g., about 0.6).

In other examples a criterion for classification might be different. In these cases, the respective threshold can be influenced by the way in which the relationship of the parameters indicative of a presence and/or concentration of the analyte in the confirmation aliquot and in the control aliquot are determined. For instance, if the ratio is determined in a reversed fashion compared to the workflow of FIG. 2, the sample might be classified as confirmed if the ratio exceeds a predetermined threshold. If the parameters (e.g., the COIs) are subtracted to determine the relationship, a value of about 0 might be the threshold between a confirmed and a non-confirmed sample.

In FIG. 2, only the ratio of the COI is used to classify the biological sample. In other examples, additional information than the ratio (or any other relationship between the parameters of the analyte in the confirmation aliquot and in the control aliquot) can be used. In one example, the determined parameter indicative of a presence and/or concentration of the analyte in the confirmation aliquot and/or in the control aliquot itself (e.g., the COI values) can be used to classify the biological sample. For example, the automated analyzer can determine if the COI (or any others suitable parameter) of the control aliquot lies below or above a predetermined threshold.

In addition, or alternatively, the automated analyzer system can classify the biological sample in more than two classes (e.g., three classes, four classes or more than four classes).

For example, the automated analyzer system can further employ one or both of a third class which indicates that the test result of the biological sample is invalid and a fourth class which indicates that the test result cannot be classified in one of the first and second classes (e.g., indeterminate).

In one example, the automated analyzer determines: i) if the ratio between the parameter indicative of a presence and/or concentration of the analyte in the confirmation aliquot and in the control aliquot is equal or below a first threshold or above the first threshold, and ii) if the parameter itself (e.g., the COI) of the control aliquot and/or the confirmation aliquot is equal or below a second threshold or above the second threshold.

If the ratio is equal to or below the first threshold and the parameter of the control aliquot is equal to or above the second threshold, the biological sample can be classified as reactive.

If the ratio is equal to or below the first threshold and the parameter of the control aliquot is below the second threshold, the biological sample can be classified as indeterminate.

If the ratio is above the first threshold and the parameter of the control aliquot is equal to or above the second threshold, the biological sample can be classified as non-reactive.

If the ratio is above the first threshold and the parameter of the control aliquot is below the second threshold, the biological sample can be classified as non-valid.

In the one example, the automated analyzer system can classify the biological sample as follows:

If ratio "confirmation/control" x>60% and COI for control aliquot ≥0.81→negative (non-reactive);

if ratio "confirmation/control" x>60% and COI for control reagent <0.81→non valid;

if ratio "confirmation/control" x≤60% and COI for control reagent ≥0.81→positive (reactive);

if ratio "confirmation/control" x≤60% and COI for control reagent <0.81→indeterminate.

Besides the variations and alternatives discussed above, the techniques for automatically performing a confirmation test can also include one or more of the following features:

In the example of FIG. 2, one control and one confirmation aliquot are prepared. In other examples, a workflow can involve preparing multiple control aliquots and/or multiple confirmation aliquots.

In addition, or alternatively, the automated analyzer system can be configured to carry out one or more additional tests to secure the validity of the test. In one example, a positive control test can be run in parallel to the tests on the confirmation and control aliquots described above.

Furthermore, as shown in FIG. 1 and described above, the operator can select between multiple workflows in some examples. This might mean that an operator selects a workflow not perfectly suitable for the respective biological sample.

In one example, the controller of the automated analyzer system can be configured to check if the selection of the one of the workflows received through the user interface fulfills one or more criteria. In one example, the one or more criteria can be whether the assigned value or the range of values of the measured parameter indicative of a presence and/or concentration of the analyte in the biological sample of the selected workflow matches the parameter indicative of a presence and/or concentration of the analyte which has been measured on the biological sample. In addition, the controller can be configured to output a warning or error message if the selected workflow received through the user interface does not fulfill the one or more criteria. In addition, or alternatively, the controller can be configured to prevent the steps of the selected workflow from being carried out if the selected workflow received through the user interface does not fulfill the one or more criteria.

In one example, a criterion can be whether the COI of the biological sample matches to the range of COIs the selected workflow is assigned to. A warning message can be output to the user if this is not the case (e.g., "confirmation not valid;" "sample titer too high," "sample titer too low").

In summary, the automated analyzer automatically performs formerly manually executed potentially error-prone steps which might result in falsely diluting the sample, pipetting errors and the like. Furthermore, the classification of the sample (and potentially other steps) formerly carried out by the operator are automated. This can reduce a number of errors occurring in the process and might require a lower amount of operator time.

Moreover, the test can consume a lower volume of a biological sample than previous tests. The total volume of the sample required to carry out the test might be somewhat higher than the volume consumed in the test (e.g., there might be a certain dead volume which cannot be used in the test). A lower sample consumption, in turn, can mean that reagent and sample volumes can be reduced in some situations.

In some examples, a consumption of a biological sample in the confirmation test (i.e., the volume used in the confirmation test) can be less than 120 µL optionally less than 50 µL.

In an embodiment, the consumption of less than 120 µL or less than 50 µL, respectively, relates to the summed up biological sample volume contained in the first and second sample aliquots. For positive samples having a cutoff index <7.0 less than 100 µL can be sufficient in some situations, for positive samples having a cutoff index ≥7.0 less than 40 µL can be sufficient.

Confirmation Test with Automated Workflow Selection

In the examples described above, an operator selects one of the multiple workflows. Subsequently, a variant of the techniques of the present disclosure will be discussed in which the automated analyzer system automatically selects the workflow to be carried out in connection with FIG. 3.

Figure 3:
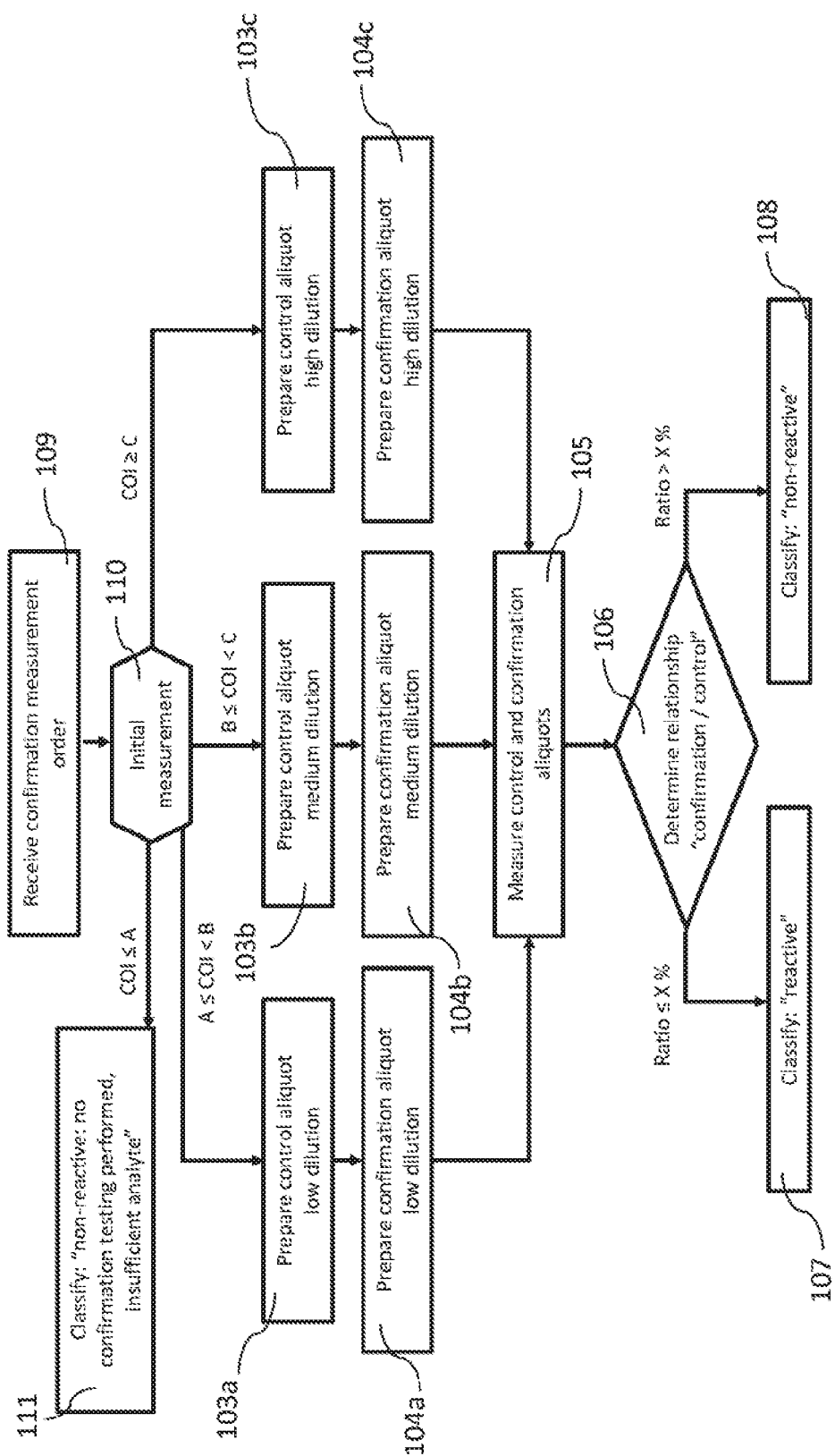
FIG. 3 includes a flow diagram of another example confirmation test procedure according to the present disclosure.

As can be seen, the technique of FIG. 3 includes selecting a workflow to be carried out by the automated analyzer. In the example of FIG. 3, three workflows are provided by the automated analyzer system with different levels of dilution ("low," "medium" and "high"). The workflows are the same as the workflows discussed in connection with FIG. 2 above. In particular, the workflows include the preparation steps of a confirmation and control aliquot 103a-c, 104a-c, and the measurement 105, determining of relationship 106 and classification steps 107, 108 performed automatically, as explained above. Thus, all aspects discussed in connection with FIG. 2 with respect to these steps can also be employed in the techniques where the automated analyzer system automatically selects the workflow to be carried out.

Having said this, the discussion of FIG. 3 will focus on the additional and/or different aspects of the method where the automated analyzer system automatically selects the workflow to be carried out.

As can be seen, the process can start with a receipt of an order for a confirmation measurement for a known reactive sample at the automated analyzer system (step 109).

Subsequently, the automated analyzer uses the sample processing system to carry out an initial test (at 110) on the biological sample to determine a presence and/or concentration of the analyte.

This test can be an HBsAg assay, as discussed above, or any other suitable test on the biological sample.

In the example of FIG. 3, the initial test yields a COI value of the biological sample. In other examples, other quantitative or qualitative parameters indicating a presence and/or concentration of the analyte.

In other examples, a parameter indicating a presence and/or concentration of the analyte in the sample (e.g., a COI) already determined (e.g., in a test previously performed) can be used. In this case, no initial test is necessary in step 110 and the automated analyzer can use the parameter indicating a presence and/or concentration of the analyte in the sample already obtained in the steps discussed below. Depending on the outcome of the initial test (or a value of the already determined parameter indicating a presence and/or concentration), the automated analyzer carries out one or more of the following operations.

In one example, the automated analyzer system can initiate performing the confirmation test only if the initial test indicates the presence and/or a certain concentration of the analyte in the biological sample. In the example of FIG. 3, the automated analyzer only initiates the confirmation test if the initial test yields a COI that is above a first threshold (COI>A). If the COI is equal to or below the first threshold (COI≤A), the automated analyzer system classifies the biological sample as non-reactive (at 111). The automated analyzer system can output a corresponding message on a user interface (e.g., "non-reactive: no confirmation testing performed, insufficient analyte").

In addition, or alternatively, the automated analyzer system can classify the biological sample to be analyzed based on the measured parameter indicative of a presence and/or concentration of the analyte in the biological sample in one of a plurality of classes. The plurality of classes can include at least a first class for situations when the measured parameter ranges below a predefined second threshold and a second class for situations when the measured parameter ranges above a predefined third threshold (the second threshold and the third threshold can have different values).

In the example of FIG. 3, the automated analyzer system classifies the biological sample in three classes depending on the determined COI value: A first class if the COI is between the first threshold and a second threshold (A≤COI<B—a "low COI" class), a second class if the COI is between the second threshold and a third threshold (B≤COI<C—a "medium COI" class), and a third class if the COI is between equal to or above the third threshold (C≥COI—a "high COI" class).

In other examples, the automated analyzer might include a lower number of classes (e.g., two classes) or a higher number of classes (e.g., four or more classes).

Based on the determined class, the automated analyzer system automatically select the one of the multiple workflows to be carried out. The automated analyzer system can then proceed to carry out the selected workflow as discussed above.

Additionally, the automated analyzer can be further configured to present the selected workflow to a user (e.g., on a user interface of the automated analyzer system) and receive a confirmation from the user that the selected workflow shall be carried out. In other examples, the complete process is carried out without user confirmation.

Automating the selection process of the workflow can further reduce an intellectual burden for the operator and reduce the error rate in some examples.

Combined Diagnostic/Screening and Confirmation Tests

In the examples described above in connection with FIG. 2 and FIG. 3, different aspects of confirmation tests that can be performed on a biological sample have been described. In this case, a prior diagnostic or screening might have yielded a positive result for a biological sample. In some additional examples, the techniques of the present disclosure can include performing the initial diagnostic or screening test. This can also happen in an automated fashion. This will be discussed subsequently in connection with FIG. 4.

Figure 4:
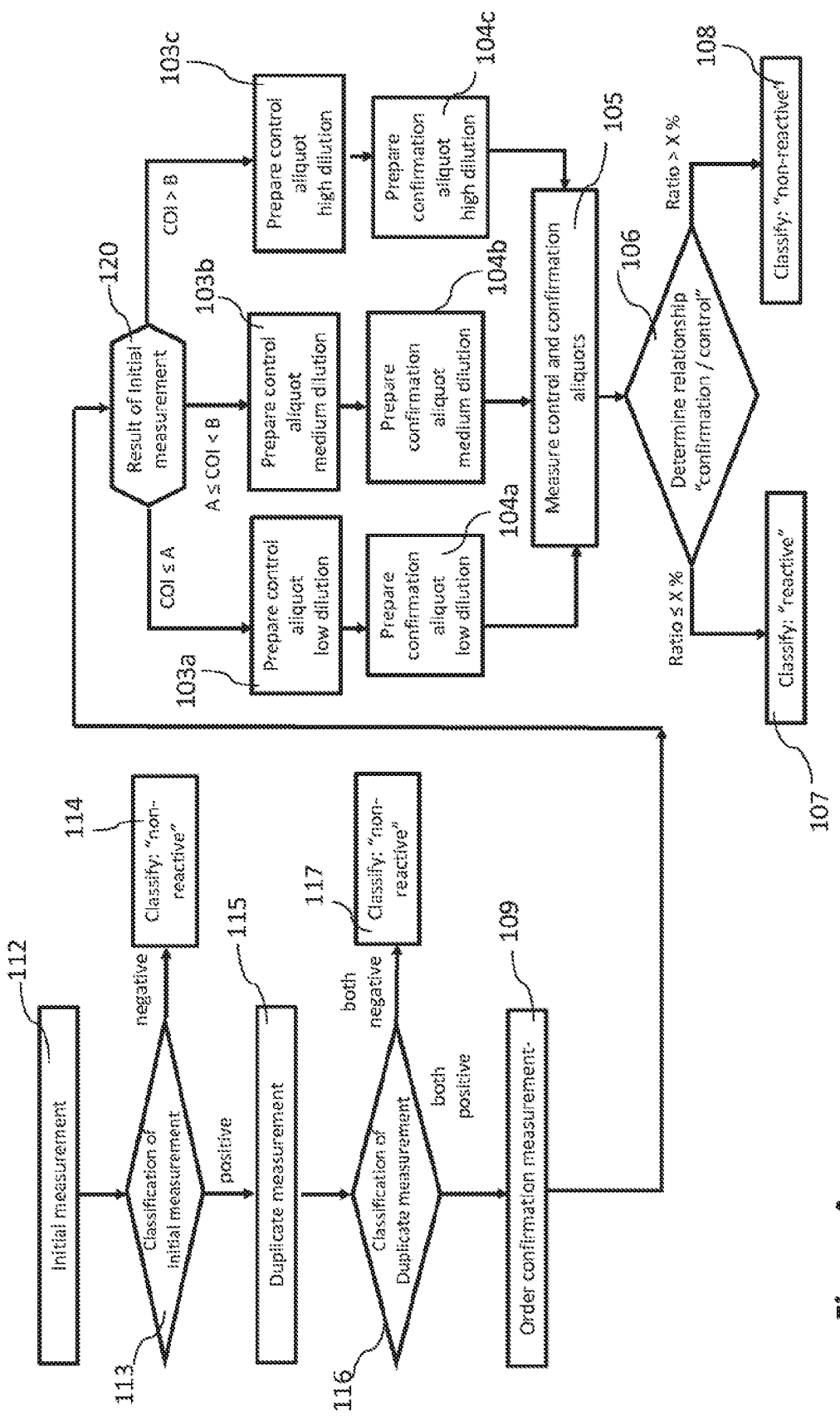
FIG. 4 includes a flow diagram of an example combined screening or diagnostic test and confirmation test procedure according to the present disclosure.

As can be seen, the example flow diagram of FIG. 4 includes the automated confirmation test sequence of FIG. 3 on the right hand side. In addition, the technique of FIG. 4 includes automatically performing a screening or diagnostic test to determine if a biological sample is positive or reactive (the steps are shown on the left hand side of FIG. 4).

The automated analyzer system can automatically order a confirmation test. This confirmation test can involve any of the embodiments discussed herein in this respect (e.g., it might include using an operator selected workflow, or a workflow automatically selected by the automated analyzer system).

In one example, the screening or diagnostic test includes a first test on a screening aliquot of the biological sample and a duplicate test on one or more further aliquots of the biological sample (the duplicate test can include two or more tests on two or more aliquots of the biological sample). Only if the first and the duplicate tests yield that the biological sample is reactive, the confirmation test is ordered. In other examples, a different number of tests can be used and/or the confirmation test can be ordered under different circumstances.

In the example screening or diagnostic test of FIG. 4, at 112 an initial measurement is carried out (e.g., determining a COI of the biological sample). In one example, an automated HBsAg assay can be employed (e.g., the assay discussed above in connection with FIG. 2).

Depending on the result of the initial measurement, the biological sample is classified as positive or negative 113. For instance, this can happen based on a COI of the biological sample, as discussed above.

In case of an initial borderline or positive result, the measurement is repeated. In one example, the measurement is repeated in duplicate (step 115). The assay used for the initial measurement can again be used. This operation can be triggered automatically by the automated analyzer system (with or without user confirmation).

The repeated measurement can be followed by another classification step (116). In case both duplicate repeat measurements are negative, the final result interpretation is considered to be non-reactive (117). No additional measurements have to be performed in this case and the screening process is finished.

If one or both of the repeated measurements show a borderline or positive result, the sample is considered as repeatedly reactive, triggering an ordering of the automatic confirmation test of the sample (109).

In one example, the automated analyzer can select 120 the one of the multiple workflows to be carried out based on the results obtained in the previous tests (e.g., the initial measurement 112 and/or duplicate measurement 115).

All results can be output on a user interface of the automated analyzer system.

The fully automated combination of a screening and diagnostic test and a confirmation test can further improve the efficiency of the system. In particular, a time to result can be reduced as the confirmation test can directly be ordered and started when the screening or diagnostic test is positive.

In the preceding detailed description multiple examples of systems and methods of classifying a biological sample regarding the presence of an analyte have been discussed. However, the systems and methods for classifying a biological sample regarding the presence of an analyte can also be configured as set out in the following typical embodiments:

Embodiment 1

An automated analyzer system for biological samples, comprising:
a sample processing system;
a controller configured to:
receive a selection of one of multiple workflows for determining a presence and/or concentration of an analyte in a biological sample;
prompt the automated analyzer system to automatically carry out the selected workflow using the sample processing system; and
output a result classifying the biological sample; and
wherein each of the multiple workflows is assigned to a value or a range of values of a measured parameter indicative of a presence and/or concentration of the analyte and defines a plurality of steps to be carried out by the automated analyzer system, the plurality of steps including:
preparing at least a first and a second sample aliquot from a biological sample with particular levels of dilution, the first sample aliquot being a confirmation aliquot and the second sample aliquot being a control aliquot;
adding predefined quantities of one or more agents to specifically determine the presence of said analyte to the confirmation aliquot and the control aliquot;
determining a parameter indicative of a presence and/or concentration of the analyte in the confirmation aliquot and in the control aliquot;
determining a relationship of the determined parameters of the analyte in the confirmation aliquot and in the control aliquot; and
based on the determined relationship, classifying the biological sample in one of a plurality of classes regarding the presence of the analyte.

Embodiment 2

The automated analyzer system of embodiment 1, wherein the automated analyzer system further includes a user interface, and wherein the automated analyzer system is configured so that a user can confirm or reject through the user interface the automated execution of one or more of the steps of a workflow being carried out.

Embodiment 3

The automated analyzer system of embodiment 1 or embodiment 2, wherein the multiple workflows include one or more workflows, in an embodiment two or more workflows, in an embodiment three or more workflows.

Embodiment 4

The automated analyzer system of any one of embodiments 1 to 3, wherein the multiple workflows are defined by a single workflow parameterized by one or more parameters, and wherein selecting one of the multiple workflows includes specifying the one or more parameters.

Embodiment 5

The automated analyzer system of embodiment 4, wherein one of the one or more parameters is a different level of dilution of the at least first and second sample aliquots.

Embodiment 6

The automated analyzer system of any one of embodiments 1 to 5, further comprising:
a user interface; and
wherein the controller is further configured to:
present one or more of the workflows to be carried out on the user interface; and
receive the selection of the one of the workflows to be carried out through the user interface.

Embodiment 7

The automated analyzer system of embodiment 6, wherein the controller is configured to check if the selection of the one of the workflows received through the user interface fulfills one or more criteria.

Embodiment 8

The automated analyzer system of embodiment 7, wherein the controller is configured to output a warning or error message if the selected workflow received through the user interface does not fulfill the one or more criteria.

Embodiment 9

The automated analyzer system of embodiment 7 or embodiment 8, wherein the controller is configured to prevent that the steps of the selected workflow are carried out if the selected workflow received through the user interface does not fulfill the one or more criteria.

Embodiment 10

The automated analyzer system of any one of embodiments 1 to 5, further comprising:
a user interface; and
wherein the controller is further configured to:
present one of the workflows to be carried out on the user interface; and
receive a confirmation that the one of the workflows be carried out through the user interface.

Embodiment 11

The automated analyzer system of any one of embodiments 6 to 10, wherein the controller is configured to automatically select the one or more workflows to be presented on the user interface.

Embodiment 12

The automated analyzer system of embodiment 11, wherein the controller is configured to automatically select the one or more workflows to be presented on the user interface based on the measured parameter indicative of a presence and/or concentration of the analyte.

Embodiment 13

The automated analyzer system of any one of embodiments 1 to 5, wherein the controller is further configured to:
automatically select the one of the multiple workflows to be carried out by the automated analyzer system.

Embodiment 14

The automated analyzer system of embodiment 13, wherein the controller is further configured to:
receive a parameter indicative of a presence and/or concentration of the analyte having been measured in the biological sample;
classify the biological sample to be analyzed based on the measured parameter indicative of a presence and/or concentration of the analyte in the biological sample in one of a plurality of classes; and
automatically select the one of the multiple workflows to be carried out by the automated analyzer system based on the classification.

Embodiment 15

The automated analyzer system of embodiment 13 or embodiment 14, wherein the controller is further configured to:
present the selected workflow to a user; and receive a confirmation from the user that the selected workflow shall be carried out.

Embodiment 16

The automated analyzer system of embodiment 14 or embodiment 15, wherein the plurality of classes include at least a first class for situations when the measured parameter ranges below a predefined first threshold and a second class for situations when the measured parameter ranges above a predefined second threshold.

Embodiment 17

The automated analyzer system of embodiment 16, wherein the first threshold and the second threshold have different values.

Embodiment 18

The automated analyzer system of any one of the preceding embodiments, wherein the controller is further configured to:
use the sample processing system to measure the parameter indicative of a presence and/or concentration of the analyte in the biological sample used for workflow selection.

Embodiment 19

The automated analyzer system of any one of the preceding embodiments, wherein the controller is further configured to:
use the sample processing system to carry out an initial test on the biological sample to determine a presence of the analyte;
initiate performing the operations defined in any one of embodiments 1 to 18 only if the initial test indicates the presence of the analyte in the biological sample.

Embodiment 20

The automated analyzer system of embodiment 19, wherein the controller is further configured to initiate performing the operations defined in any one of embodiments 1 to 18 automatically if the initial test indicates the presence of the analyte in the biological sample.

Embodiment 21

The automated analyzer system of embodiment 19, wherein the controller is further configured to initiate performing the operations defined in any one of embodiments 1 to 18 upon user confirmation if the initial test indicates the presence of the analyte in the biological sample.

Embodiment 22

The automated analyzer system of any one of embodiments 19 to 21, wherein the initial test is a screening or diagnostic test and the operations defined in any one of embodiments 1 to 18 are a part of a confirmation test.

Embodiment 23

The automated analyzer system of any one of embodiments 19 to 22, wherein the initial test includes:
a first test on a screening aliquot of the biological sample; and
a duplicate test on one or more further aliquots of the biological sample,
wherein the operations defined in any one of embodiments 1 to 18 are only initiated if the first and the duplicate test indicate the presence of the analyte in the biological sample.

Embodiment 24

The automated analyzer system of embodiment 23, wherein the duplicate test includes two or more tests on two or more aliquots of the biological sample.

Embodiment 25

The automated analyzer system of any one of the preceding embodiments 1 to 24, wherein the measured parameter indicative of a presence and/or concentration of the analyte in the biological sample is a cutoff index or a concentration unit, wherein each workflow is associated to a range of cut off indices or concentration units.

Embodiment 26

The automated analyzer system of any one of embodiments 1 to 25, wherein the analyte is indicative of a hepatitis infection, optionally wherein the analyte is a hepatitis B antigen, optionally hepatitis B surface antigen.

Embodiment 27

The automated analyzer system of any one of embodiments 1 to 26, wherein each workflow is associated to a range of cut off indices.

Embodiment 28

The automated analyzer system of any one of embodiments 1 to 27, wherein the particular levels of dilution are defined based on the respective value or range values of the measured parameter indicative of a presence and/or concentration of the analyte the respective workflow is assigned to.

Embodiment 29

The automated analyzer system of embodiment 28, wherein the particular levels of dilution of the multiple workflows include at least one level of dilution other than zero, optionally two or more levels other than zero.

Embodiment 30

The automated analyzer system of any one of embodiments 1 to 29, wherein the at least first and second sample aliquots contain a volume of less than 120 µL, optionally of less than 50 µL of the biological sample.

Embodiment 31

The automated analyzer system of any one of embodiments 1 to 30, wherein the automated analyzer system is configured to carry out the steps according to any one of methods of embodiments 1 to 30 as part of a screening or diagnostic test on a biological sample for which the presence and/or concentration of the analyte has not been determined.

Embodiment 32

The automated analyzer system of any one of embodiments 1 to 18 or embodiments 25 to 30, wherein the automated analyzer system is configured to carry out the steps according to any one of methods of embodiments 1 to 18 or embodiments 25 to 30 as part of a confirmation process on a biological sample for which the presence and/or concentration of the analyte has been found in an initial screening or diagnostic test.

Embodiment 33

The automated analyzer system of any one of embodiments 1 to 18 or embodiments 25 to 31, wherein the biological sample is a sample for which the presence of the analyte has been found in an initial test.

Embodiment 34

The automated analyzer system of any one of embodiments 1 to 33, wherein classifying the biological sample regarding a presence of the analyte includes determining if the biological sample falls within a plurality of classes including at least a first class which indicates that the biological sample is reactive and a second class which indicates that the biological sample is non-reactive.

Embodiment 35

The automated analyzer system of embodiment 34, wherein the plurality of classes further includes one or both of a third class which indicates that the test result of the biological sample is invalid and a fourth class which indicates that the test result cannot be classified in one of the first and second classes (e.g., indeterminate).

Embodiment 36

The automated analyzer system of any one of embodiments 1 to 35, wherein the relationship of the determined parameter of the analyte in the confirmation aliquot and in the control aliquot includes a ratio of the determined parameter of the analyte in the confirmation and the control aliquots.

Embodiment 37

The automated analyzer system of embodiment 36, wherein a test indicates the presence of the analyte in the biological sample if the ratio exceeds or falls below a predetermined threshold.

Embodiment 38

The automated analyzer system of any one of embodiments 1 to 37 comprising:
an automated analyzer including the sample processing system and the controller integrated in a single unit.

Embodiment 39

The automated analyzer system of any one of embodiments 1 to 37 comprising:
an automated analyzer including the sample processing system,
wherein the controller is arranged remotely from the automated analyzer.

Embodiment 40

The automated analyzer system of any one of embodiments 1 to 39, wherein the plurality of steps of each workflow further include:
adding a neutralization agent to the first sample aliquot to prepare the confirmation aliquot.

Embodiment 41

The automated analyzer system of any one of embodiments 1 to 40, wherein the plurality of steps of each workflow further include:
adding a control agent to the second sample aliquot to prepare the control aliquot.

Embodiment 42

A computer implemented method, comprising:
receiving a selection of one of multiple workflows for determining a presence and/or concentration of an analyte in a biological sample;
prompting an automated analyzer system to automatically carry out the selected workflow using a sample processing system; and
outputting a result classifying the biological sample;
wherein each of the multiple workflows is assigned to a value or a range of values of the measured parameter indicative of a presence and/or concentration of the analyte and defines a plurality of steps to be carried out by the automated analyzer system, the plurality of steps including:

preparing at least a first and a second sample aliquot from a biological sample with particular levels of dilution, the first sample aliquot being a confirmation aliquot and the second sample aliquot being a control aliquot;

adding predefined quantities of one or more agents to specifically determine the presence of said analyte to the confirmation aliquot and the control aliquot;

determining a parameter indicative of a presence and/or concentration of the analyte in the confirmation aliquot and in the control aliquot;

determining a relationship of the determined parameters of the analyte in the confirmation aliquot and in the control aliquot; and based on the determined relationship, classifying the biological sample in one of a plurality of classes regarding the presence of the analyte.

Embodiment 43

A computer-readable medium storing instructions thereon which when carried out by a controller of an automated analyzer system prompts the automated analyzer system to carry out the steps of the method of embodiment 42.

Computer-Implementation

Further disclosed and proposed is a computer program including computer-executable instructions for performing the method according to the present disclosure in one or more of the embodiments discussed herein when the program is executed on a computer or computer network. Specifically, the computer program may be stored on a computer-readable data carrier. Thus, specifically, one, more than one or even all of method steps as disclosed herein may be performed by using a computer or a computer network, typically by using a computer program.

Further disclosed and proposed is a computer program product having program code means, in order to perform the method according to the present disclosure in one or more of the embodiments discussed herein when the program is executed on a computer or computer network. Specifically, the program code means may be stored on a computer-readable data carrier.

Further disclosed and proposed is a data carrier having a data structure stored thereon, which, after loading into a computer or computer network, such as into a working memory or main memory of the computer or computer network, may execute the method according to one or more of the embodiments disclosed herein.

Further disclosed and proposed is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed is a modulated data signal which contains instructions readable by a computer system or computer network, for performing the method according to one or more of the embodiments disclosed herein.

Referring to the computer-implemented embodiments of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing measurements.

Further disclosed and proposed is a computer or computer network comprising at least one processor, wherein the processor is adapted to perform the method according to one of the embodiments described in this description.

Further disclosed and proposed is a computer loadable data structure that is adapted to perform the method according to one of the embodiments described in this description while the data structure is being executed on a computer.

Further disclosed and proposed is a storage medium, wherein a data structure is stored on the storage medium and wherein the data structure is adapted to perform the method according to one of the embodiments described in this description after having been loaded into a main and/or working storage of a computer or of a computer network.

What is claimed is:

1. An automated analyzer system for biological samples, comprising:
   a sample processing system;
   a controller configured to:
      receive a selection of one of multiple workflows for determining a presence and/or concentration of an analyte in a biological sample;
      prompt the automated analyzer system to automatically carry out the selected workflow using the sample processing system; and
      output a result classifying the biological sample; and
   wherein each of the multiple workflows is assigned to a value or a range of values of a measured parameter indicative of a presence and/or concentration of the analyte from an initial screening or diagnostic test and defines a plurality of steps to be carried out by the automated analyzer system, the plurality of steps including:
      preparing at least a first and a second sample aliquot from a biological sample with particular levels of dilution, the first sample aliquot being a confirmation aliquot and the second sample aliquot being a control aliquot;
      adding predefined quantities of one or more agents to specifically determine the presence of said analyte to the confirmation aliquot and the control aliquot;
      determining a parameter indicative of a presence and/or concentration of the analyte in the confirmation aliquot and in the control aliquot;
      determining a relationship of the determined parameters of the analyte in the confirmation aliquot and in the control aliquot; and
      based on the determined relationship, classifying the biological sample in one of a plurality of classes regarding the presence of the analyte,
   wherein the confirmation aliquot includes a neutralization agent to reduce an effect of the one or more agents to determine the presence of the analyte, and wherein the control aliquot includes a substance which does not affect the signal produced by the second sample aliquot.

2. The automated analyzer system of claim 1, further comprising:
   a user interface; and
   wherein the controller is further configured to:
      present one or more of the workflows to be carried out on the user interface; and receive the selection of the one of the workflows to be carried out through the user interface.

3. The automated analyzer system of claim 2, wherein the controller is configured to check if the selection of the one of the workflows received through the user interface fulfills one or more criteria.

4. The automated analyzer of claim 3, wherein the controller is configured to output a warning or error message if the selected workflow received through the user interface does not fulfill the one or more criteria.

5. The automated analyzer system of claim 1, wherein the controller is further configured to automatically select the one of the multiple workflows to be carried out by the automated analyzer system.

6. The automated analyzer system of claim 5, wherein the controller is further configured to:
receive a parameter indicative of a presence and/or concentration of the analyte having been measured in the biological sample;
classify the biological sample to be analyzed based on the measured parameter indicative of a presence and/or concentration of the analyte in the biological sample in one of a plurality of classes; and
automatically select the one of the multiple workflows to be carried out by the automated analyzer system based on the classification.

7. The automated analyzer system of claim 6, wherein the plurality of classes include at least a first class for situations when the measured parameter ranges below a predefined first threshold and a second class for situations when the measured parameter ranges above a predefined second threshold.

8. The automated analyzer system of claim 7, wherein the first threshold and the second threshold have different values.

9. The automated analyzer system of claim 1, wherein the controller is further configured to use the sample processing system to measure the parameter indicative of a presence and/or concentration of the analyte in the biological sample used for workflow selection.

10. The automated analyzer system of claim 1, wherein the controller is further configured to:
use the sample processing system to carry out an initial test on the biological sample to determine a presence of the analyte;
initiate performing the operations defined in claim 1 only if the initial test indicates the presence of the analyte in the biological sample, wherein the controller is further configured to initiate performing the operations defined in claim 1 automatically if the initial test indicates the presence of the analyte in the biological sample, wherein the initial test is a screening or diagnostic test and the operations defined in claim 1 are a part of a confirmation test.

11. The automated analyzer system of claim 1, wherein the measured parameter indicative of a presence and/or concentration of the analyte in the biological sample is a cutoff index or a concentration unit, wherein each workflow is associated to a range of cut off indices or concentration units.

12. The automated analyzer system of claim 1, wherein the analyte is a protein.

13. The automated analyzer system of claim 1, wherein the analyte is a pathogen or an antibody produced in reaction to an infection by a pathogen.

14. The automated analyzer system of claim 1, wherein the analyte is indicative of a hepatitis infection.

15. The automated analyzer system of claim 1, wherein the particular levels of dilution are defined based on the respective value or range of values of the measured parameter indicative of a presence and/or concentration of the analyte the respective workflow is assigned to.

16. The automated analyzer system of claim 1, wherein the at least first and second sample aliquots contain a volume of less than 120 μL of the biological sample.

17. The automated analyzer system of claim 1, wherein the at least first and second sample aliquots contain a volume of less than 50 μL of the biological sample.

18. The automated analyzer system of claim 1, wherein the plurality of steps of each workflow further include:
adding a neutralization agent to the first sample aliquot to prepare the confirmation aliquot; and/or
adding a control agent to the second sample aliquot to prepare the control aliquot.

19. The automated analyzer system of claim 1, wherein the relationship of the determined parameter of the analyte in the confirmation aliquot and in the control aliquot includes a ratio of the determined parameter of the analyte in the confirmation and the control aliquots.

20. The automated analyzer system of claim 1, wherein the plurality of classes include at least a first class which indicates that the parameter ranges below a first threshold, and a second class which indicates that the parameter ranges above a second threshold.

21. A computer implemented method, comprising:
receiving a selection of one of multiple workflows for determining a presence and/or concentration of an analyte in a biological sample;
prompting an automated analyzer system to automatically carry out the selected workflow using a sample processing system; and
outputting a result classifying the biological sample;
wherein each of the multiple workflows is assigned to a value or range of values of a measured parameter indicative of a presence and/or concentration of the analyte from an initial screening or diagnostic test and defines a plurality of steps to be carried out by the automated analyzer system, the plurality of steps including:
preparing at least a first and a second sample aliquot from a biological sample with particular levels of dilution, the first sample aliquot being a confirmation aliquot and the second sample aliquot being a control aliquot;
adding predefined quantities of one or more agents to specifically determine the presence of said analyte to the confirmation aliquot and the control aliquot;
determining a parameter indicative of a presence and/or concentration of the analyte in the confirmation aliquot and in the control aliquot;
determining a relationship of the determined parameters of the analyte in the confirmation aliquot and in the control aliquot; and
based on the determined relationship, classifying the biological sample in one of a plurality of classes regarding the presence of the analyte,
wherein the confirmation aliquot includes a neutralization agent to reduce an effect of the one or more agents to determine the presence of the analyte, and wherein the control aliquot includes a substance which does not affect the signal produced by the second sample aliquot.

22. A non-transitory computer-readable medium storing instructions thereon which when carried out by a controller of an automated analyzer system prompts the automated analyzer system to carry out the steps of the method of claim 21.

* * * * *